US008038935B2

(12) United States Patent
Koper et al.

(10) Patent No.: US 8,038,935 B2
(45) Date of Patent: Oct. 18, 2011

(54) TREATMENT OF ODORS USING NANOCRYSTALLINE METAL OXIDES

(75) Inventors: Olga Koper, Manhattan, KS (US);
HaiDoo Kwen, Manhattan, KS (US);
Scott Toerber, Blue Rapids, KS (US);
Kyle Knappenberger, Topeka, KS (US);
David Jones, Manhattan, KS (US);
Debbie Basco, Manhattan, KS (US);
Ken Klabunde, Manhattan, KS (US);
Bill Sanford, Naples, FL (US)

(73) Assignee: NanoScale Corporation, Manhattan, KS (US)

( * ) Notice: Subject to any disclaimer, the term of this patent is extended or adjusted under 35 U.S.C. 154(b) by 452 days.

(21) Appl. No.: 12/091,671

(22) PCT Filed: Oct. 26, 2006

(86) PCT No.: PCT/US2006/060275
§ 371 (c)(1),
(2), (4) Date: Aug. 26, 2008

(87) PCT Pub. No.: WO2007/051145
PCT Pub. Date: May 3, 2007

(65) Prior Publication Data
US 2009/0098016 A1 Apr. 16, 2009

Related U.S. Application Data

(60) Provisional application No. 60/730,341, filed on Oct. 26, 2005, provisional application No. 60/760,802, filed on Jan. 20, 2006.

(51) Int. Cl.
*A61L 9/00* (2006.01)
*A61L 9/015* (2006.01)
*A61L 9/01* (2006.01)
*A62B 7/08* (2006.01)
*A01N 25/00* (2006.01)
*A01N 59/20* (2006.01)
*C09K 3/00* (2006.01)

(52) U.S. Cl. .............. 422/5; 422/1; 422/4; 422/122; 422/311; 422/900; 424/405; 424/76.2; 424/76.8; 424/635; 424/688; 252/372

(58) Field of Classification Search ............. 422/1, 4–5, 422/122, 311, 900; 424/405, 76.2, 76.8, 424/635, 688; 252/372
See application file for complete search history.

(56) References Cited

U.S. PATENT DOCUMENTS

| 5,759,939 A | 6/1998 | Klabunde et al. |
| 5,955,413 A * | 9/1999 | Campagna et al. ........... 510/278 |
| 6,057,488 A | 5/2000 | Koper et al. |
| 6,087,294 A | 7/2000 | Klabunde et al. |
| 6,093,236 A | 7/2000 | Klabunde et al. |

(Continued)

OTHER PUBLICATIONS

Examination Report for NZ Patent Application Serial No. 568556, dated Feb. 3, 2010 (2 pgs).

*Primary Examiner* — Jill Warden
*Assistant Examiner* — Monzer Chorbaji
(74) *Attorney, Agent, or Firm* — Hovey Williams LLP

(57) ABSTRACT

Methods of removing odors, particularly odors within enclosed environments are provided which employ nanocrystalline metal oxide and metal hydroxide particles. The nanocrystalline particles are dispersed within an enclosed space so as to contact exposed surfaces located within the space such as walls, floors, upholstery, and the like and adsorb odor-causing materials located within the enclosed space.

26 Claims, 10 Drawing Sheets

U.S. PATENT DOCUMENTS

| | | | |
|---|---|---|---|
| 6,316,521 B1 * | 11/2001 | Disch et al. | 523/102 |
| 6,417,423 B1 | 7/2002 | Koper et al. | |
| 6,653,519 B2 | 11/2003 | Koper et al. | |
| 6,827,766 B2 * | 12/2004 | Carnes et al. | 106/15.05 |
| 6,843,919 B2 | 1/2005 | Klabunde et al. | |
| 6,860,924 B2 | 3/2005 | Rajagopalan et al. | |
| 6,887,302 B2 | 5/2005 | Rajagopalan et al. | |
| RE39,098 E | 5/2006 | Klabunde et al. | |
| 7,276,640 B2 | 10/2007 | Mulukutla et al. | |
| 7,279,129 B2 | 10/2007 | Lanz et al. | |
| 7,335,808 B2 | 2/2008 | Koper et al. | |
| 7,661,483 B2 | 2/2010 | Mulukutla et al. | |
| 2005/0084464 A1 * | 4/2005 | McGrath et al. | 424/67 |

* cited by examiner

TREATMENT OF ODORS USING NANOCRYSTALLINE METAL OXIDES

RELATED APPLICATIONS

This application is a national stage application under 35 U.S.C. 371 of International Application PCT/US2006/060275, filed Oct. 26, 2006 which claims the benefit of U.S. Provisional Application Ser. No. 60/730,341, filed Oct. 26, 2005, incorporated by reference herein, and U.S. Provisional Application Ser. No. 60/760,802, filed Jan. 20, 2006, incorporated by reference herein.

BACKGROUND OF THE INVENTION

1. Field of the Invention

The present invention generally pertains to methods of treating odors, particularly odors and present within enclosed environments, using nanocrystalline metal oxide and metal hydroxide particles.

2. Description of the Prior Art

Common sources of malodors include smoke/tobacco, human and pet excrements, mold and mildew, bacteria, food, beverages (spoiled milk), vomit, and dirty clothes. Although malodors have a multitude of different sources, chemically speaking, most malodors are organic (carbon containing compounds) in nature. Malodors, can easily permeate, penetrate, impregnate and cling to organic surfaces within enclosed environments such as cars and buildings.

Various types of odor problems occur in homes. Some of the leading causes of nuisance odors are the result of the biological contamination. When these microbial organisms decay and rot, they give off gases and noxious fumes. Unfortunately these are not just aesthetic problems. Health concerns ranging from nausea to death can arise from acute and repeated exposure to these and other odor causing compounds. Indoor air pollution is now considered by the EPA and Congress to be America's No. 1 environmental health problem. It is estimated that 4-5 million Americans already suffer from the effects of chemically induced environmental illnesses. Tightly sealed buildings and homes may be more energy efficient but can trap pollutants and microbes indoors causing allergies, odors, mold, and illness.

Furthermore, the EPA conducted a 17-year study and found that women working in their homes had a 55% greater risk of dying from cancer than those who worked in an office, primarily due to the use of ordinary household cleaners. Some of the products found in American homes have chemical ingredients that are potentially harmful. These products include oven cleaners, paint removers, pesticides, solvents, drain cleaners, and more.

Treatment of malodors is generally approached in two ways: masking or elimination. If odor masking is used, the source of the mal odor is not eliminated and will eventually return once the "masking" agent is removed. In many cases, the malodor is so overpowering that a masking agent is ineffective. Treatment by elimination, on the other hand, removes the malodor by removing its source. Elimination can be done by physically replacing the contaminated surface or by removing the malodor-causing agent itself.

Numerous compositions and methods have been developed for reducing odors from a variety of sources; however, they have had only limited success because the odors associated with a wide range of sources are complex and can comprise a mixture of different substances including, but not limited to inorganic bases such as ammonia, organic acids such as butylic acid and isovaleric acid, and neutral molecules such as acetaldehyde and methyl mercaptan. The most common ways of reducing malodors caused by these substances include: (I) masking the odor using an odor-masking aroma, (ii) adsorption of the odor using inorganic materials, such as activated carbon, sodium bicarbonate, and talcum powder, and (iii) using a composite, such as chlorine dioxide, for reducing bacteria which produce the malodorous substances. However, these methods present the following problems: (I) the odor is not eliminated, but only masked, (ii) the adsorption capability of these traditional sorbents is limited, (iii) by using the oxidizing agent, a secondary pollutant can be produced, and (iv) the sorbents can be effective only under certain conditions such as a wet environment.

SUMMARY OF THE INVENTION

The present invention overcomes the above problems by providing a method of eliminating odors and microbes that produce malodorous compounds using high-surface area, highly porous nanocrystalline metal oxide and metal hydroxide particles. The present invention is particularly suited for deodorizing areas or spaces, especially enclosed spaces such as rooms within a building or the interior of a vehicle.

In one embodiment, methods according to the present invention comprise dispersing a quantity of nanocrystalline particles into an enclosed space presenting a plurality of exposed surfaces which at least in part define the enclosed space. The nanocrystalline particles are effective at sorbing odors and odor-causing materials, such as bacteria, within the enclosed space. After a predetermined length of time, at least some of the particles, having the malodorous compounds adsorbed thereon, are removed from the enclosed space leaving the space deodorized and fresher smelling than prior to treatment.

In other embodiments according to the present invention, the enclosed space may first be cleaned to remove loose dirt or debris that may be located on the surfaces therein. Certain surfaces can then be wetted in order to better accommodate the nanocrystalline particles. The nanocrystalline particles can then be applied to the various surfaces located within the enclosed space. After dispersing the particles within the enclosed space, as many of the particles as possible are removed using a combination of wet and dry cleaning techniques.

DETAILED DESCRIPTION OF THE PREFERRED EMBODIMENT

Figure 1:
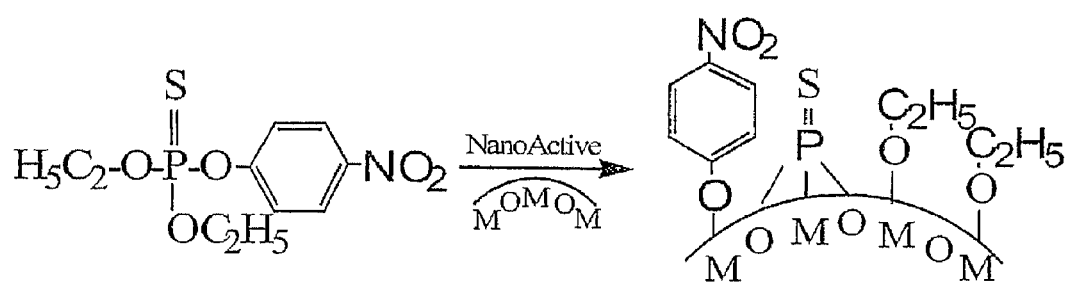
FIG. 1 depicts a chemical decomposition process for the organophosphate insecticide parathion when exposed to a nanocrystalline metal oxide.

The present invention is generally directed toward the use of nanocrystalline materials, particularly nanocrystalline metal oxides/hydroxides, coated metal oxides/hydroxides (i.e., halogen coatings), doped metal oxides/hydroxides, surfactant coated nanocrystalline metal oxides and combinations thereof for removal/neutralization of various malodors. The terms "metal oxides" and "metal hydroxides" as used herein collectively refer to all such materials that comprise, preferably as the principal constituent, a metal oxide or metal hydroxide material.

Preferred nanocrystalline materials for use in connection with the present invention include the metal oxides and metal hydroxides of Mg, Sr, Ba, Ca, Ti, Zr, Fe, V, Mn, Ni, Cu, Al, Si, Zn, Ag, Mo, Sb, and mixtures thereof. Additional preferred nanocrystalline materials include coated nanocrystalline materials such as those disclosed in U.S. Pat. Nos. 6,093,236 and 5,759,939 (metal oxide coated with another metal oxide), halogenated particles such as those disclosed in U.S. Pat. Nos. 6,653,519, 6,087,294 and 6,057,488 (nanocrystalline materials having reactive atoms stabilized on the surfaces thereof, the reactive atoms including oxygen ion moieties, ozone, halogens, and group I metals), and air stable nanocrystalline materials such as those described in U.S. Pat. Nos. 6,887,302 and 6,860,924 (nanocrystalline materials coated with a surfactant, wax, oil, silyl, synthetic or natural polymer, or resin), all of which are incorporated by reference herein. The nanocrystalline materials preferably present crystallite sizes of less than about 25 nm, more preferably less 20 than nm, and most preferably less than 10 nm. The nanocrystalline particles preferably exhibit a Brunauer-Emmett-Teller (BET) multipoint surface area of at least about 15 $m^2/g$, more preferably at least about 70 $m^2/g$, and most preferably from about 100-850 $m^2/g$. Exemplary nanocrystalline materials are available from NanoScale Materials, Inc., Manhattan, Kans., under the name NanoActive®.

The nanocrystalline materials are particularly useful in cleaning operations to remove odors from objects, and enclosed mobile and stationary environments. Contrary to odor masking methods, the nanocrystalline materials contact, adsorb, and then neutralize the odor-causing substances. The present invention also provides systems for delivering the nanocrystalline materials during this cleaning process. The appropriate delivery method for a particular operation will largely depend upon the object, surface, or area involved. Various cleaning systems and methods of delivering the nanocrystalline materials are discussed in greater detail below.

Methods and systems according to the present invention may be used to deodorize a number of both mobile and stationary enclosed environments. Exemplary enclosed mobile environments include cars and trucks, recreational vehicles, yachts, airplanes, and the like. Exemplary stationary environments include homes, offices, morgues and mortuaries, schools, restaurants, healthcare facilities, hospitals, public buildings, dormitories, hotels, motels, animal care facilities, industrial plants, trash receptacle/dumpsters, and the like. Thus, the nanocrystalline materials may be incorporated into a number of products that can be used in these deodorization operations. Such products generally include carpet deodorizers, pet deodorizing products, car deodorizing products, refrigerator deodorizers, industrial clean-up products, and human odor elimination products.

The nanocrystalline materials can be used to treat a wide variety of malodors and their sources. Exemplary malodors (and their sources) that may be treated include: animal odors, animal waste odors, asphalt fumes, charred materials, cleaning chemicals, decaying bodies, decaying vegetation, detergents, diapers, exhaust, fuel (i.e., gasoline/diesel), volatile organic compound fumes (e.g., paint, varnish, and solvent odors), odors caused by moisture or flooding (i.e., mold and mildew), human body odors (i.e.; sweat, bacterial infections, urine and fecal odors) hunting odors (i.e., deer urine), kitchen odors (i.e, refrigerator odors, burnt food, cooking odors, fish, poultry, garlic, onion, rancid oils), medicinal odors, sewer gases, smoke (e.g., tobacco smoke odors) and garbage.

Carpets, basements, and cabinets are key breeding grounds for bacteria which can be sources of unpleasant odors. These unclean surfaces and damp surroundings promote the growth of bacteria such as the gram negative organism *Escherichia coli* and the gram positive *Staphylococcus aureus*. The nanocrystalline metal oxide and metal hydroxide materials, particularly zinc oxide, are effective in killing *E. coli* (ATCC #10536) and the heartier and more difficult to kill gram positive *Staphylococcus* (ATCC #6538). Transmission Electron Microscopy (TEM) images indicated that bacteria treated with nanocrystalline metal oxide and metal hydroxide materials, upon 2-minute contact time, were destroyed by rupture of the cell walls.

Mildew and certain fungi can also produce problematic odors. In order to effectively eliminate these odors, moisture and fungi growth must be controlled. An anti-fungal efficacy study was conducted using NanoActive® ZnO in test tubes filled with a liquid medium containing a fungal organism. It was discovered that the nanocrystalline ZnO inhibited the growth of the fungal organism thereby decreasing the malodor produced by the fungus.

The nanocrystalline metal oxide and metal hydroxide materials also possess the ability to chemically dismantle a wide range of undesirable chemical compounds such as pesticides and volatile organic compounds (VOCs). Pesticides are used in more than 91% of households in the United States. Indoor contamination with pesticides is quite common. It has been suggested that 80 percent of most human exposure to pesticides occurs indoors and that measurable levels of up to a dozen pesticides have been found in the air inside homes. Reasons for this include contaminated soil or dust that floats in or is tracked in from outside, stored pesticide containers, and household surfaces that collect and then release the pesticides.

Of these pesticides it is estimated that over half are comprised of organophosphorous compounds. All organophosphates (OPs) are derived from phosphorus acids, and as a class are generally the most toxic of all pesticides to vertebrates. Organophosphates can present chemical structures similar to "nerve gases," and thus their modes of actions can also be relatively similar. The insecticidal qualities of OPs were first observed in Germany during World War 11 in the study of the extremely toxic OP nerve gases sarin, soman, and tabun.

Organophosphates work by inhibiting certain important enzymes of the nervous system, namely cholinesterase. The enzyme is phosphorylated when it becomes attached to the phosphorous moiety of the insecticide, a binding that is irreversible. This inhibition results in the accumulation of acetylcholine at the neuron/neuron and neuron/muscle (neuromuscular) junctions or synapses, causing rapid twitching of voluntary muscles and finally paralysis. Prolonged exposure to even low levels of OP pesticides can also cause adverse health impacts for pets and individuals, particularly small children who tend spend a significant portion of time in direct contact with the floor where the highest concentration of pesticides is located within the home.

Due to their enhanced chemical reactivity, nanocrystalline metal oxides and hydroxides are capable of chemically dismantling a number of these highly toxic compounds. The following is an exemplary list of common insecticides capable of being destroyed by the nanocrystalline materials: acephate, azinphos-methyl, bensulide, cadusafos, chlorethoxyfos, chlorpyrifos, chlorpyrifos methyl, chlorthiophos, coumaphos, dialiflor, diazinon, dichlorvos (DDVP), dicrotophos, dimethoate, dioxathion, disulfoton, ethion, ethoprop, ethyl parathion, fenamiphos, fenitrothion, fenthion, fonofos, isazophos methyl, isofenphos, malathion, methamidophos, methidathion, methyl parathion, mevinphos, monocrotophos, naled, oxydemeton methyl, parathion, phorate, phosalone, phosmet, phosphamidon, phostebupirim, pirimiphos methyl, profenofos, propetamphos, sulfotepp, sulprofos, temephos, terbufos, tetrachlorvinphos, tribufos (DEF), and trichlorfon.

FIG. 1 shows an exemplary chemical reaction that occurs between a nanocrystalline metal oxide and a typical organophosphate insecticide, parathion. Upon exposure of parathion to the nanocrystalline material, chemical bonds between the phosphorus and oxygen are broken and the fragments are adsorbed on the surface of the nanocrystalline material.

Organic chemicals are widely used as ingredients in a variety of household products. Paints, varnishes, and wax all contain organic solvents, as do many cleaning, disinfecting, cosmetic, degreasing, and hobby products. Further all types of fuels are made up of organic chemicals. These products can release volatile organic compounds (VOCs) during use, and, to some degree even upon storage.

The EPA's Total Exposure Assessment Methodology (TEAM) studies found levels of about a dozen common organic pollutants to be 2 to 5 times higher indoors than outside, regardless of whether the homes were located in rural or highly industrial areas. Additional TEAM studies indicated that people can expose themselves and other to very high pollutant levels while using products containing organic chemicals. These elevated concentrations of organic chemicals can persist in the air long after the activity is completed.

Volatile organic chemicals encompass a wide range of range of compounds. These chemicals range from slightly hazardous organic solvents up to highly toxic and corrosive acids. The following is an exemplary list of some common VOCs and other toxic chemical compounds: acrolein, acetaldehyde, acetone, ammonia, ethanolamine, diesel fuel, formaldehyde, hydrochloric acid, hydrofluoric acid, methanol, methylene chloride, nitrous oxide, nitric acid, nitrobenzene, phosphoric acid, polyvinyl alcohol, sulfuric acid, thiourea, toluene, thriethanolamine, methyl acrylate, acetic acid, methylpyrazines, acrylonitrile, nonvolatile nitrosamines, crotonaldehyde, N-nitrosamines, carboxylic acids, phenols, DDT/ delirin, pyrrolidine, dimethylnitrosamine, stearic acid, ethylamine, trimethylamine, vinyl chloride, and furfural.

The nanocrystalline metal oxide and hydroxide materials are particularly suited for removing and destroying these toxic organic compounds from indoor airspaces, processing streams, storage facilities, and anywhere else that these harmful compounds may be generated. Due to the inherit stability of hydrocarbons, the nanocrystalline materials will not chemically modify these compounds, but rather will physically absorb them. However, the nanocrystalline materials are capable of chemically dismantling the majority of VOCs.

Figure 2:
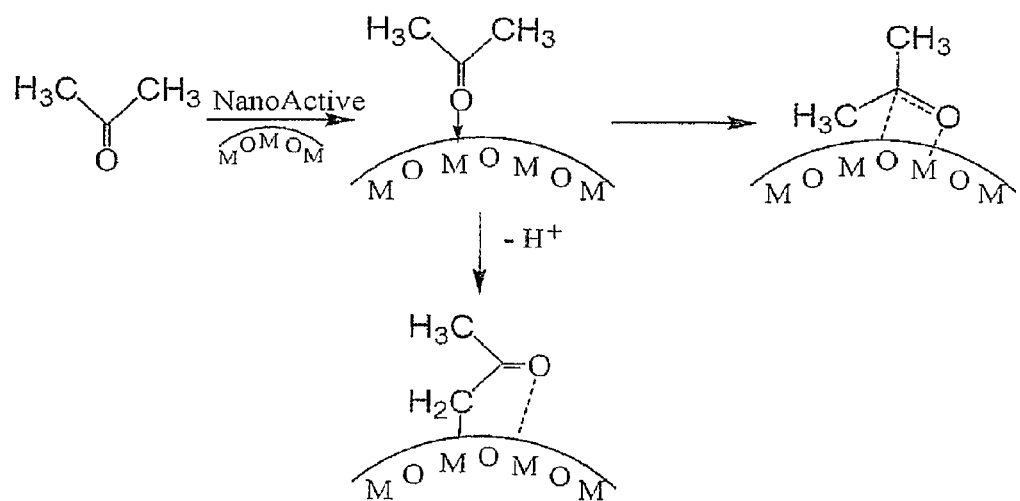
FIG. 2 depicts a chemical decomposition process for acetone when exposed to a nanocrystalline metal oxide.

As an example of the dismantling of VOCs, the reaction of acetone with a nanocrystalline metal oxide sorbent is described in FIG. 2. As shown, the reaction proceeds though the interaction of the carbonyl group with surface sites that is followed by the metal hydrogen dissociation.

The nanocrystalline materials may also be used to neutralize various acids by breaking the acid down into safe, non-toxic byproducts. As an example sorption/neutralization of hydrofluoric acid using a metal oxide is given with the formation of metal fluoride, a benign salt.

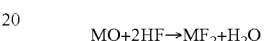

$$MO + 2HF \rightarrow MF_2 + H_2O$$

The nanocrystalline materials, especially nanocrystalline metal hydroxides, may also be used to neutralize basic compounds such as ammonia, which is present in many household-cleaning agents. Without being bound by any particular theory, it is believed that sorption occurs through interaction of ammonia with the hydroxyl groups on the surface of sorbent.

Generally, methods of eliminating malodors according to the present invention comprise contacting the chemical agent causing the malodor with the nanocrystalline material. Also, if the malodorous chemical agent is produced by a biological organism, it is preferable to contact the organism with the nanocrystalline materials so as to eliminate the source of the malodor.

Methods according to the present invention are particularly useful in deodorizing enclosed spaces. Malodors generally tend to penetrate and remain within walls, floors, ceilings, or other surfaces that define the enclosed environment. Also, any fixtures within the enclosed space may trap malodors adding to the difficulty of deodorizing the enclosed space. Therefore, the present invention generally comprises dispersing a quantity of nanocrystalline particles, selected from the group consisting of metal oxides and metal hydroxides, into the enclosed space and contacting the exposed surfaces therein, at least some of which help define the confines of the enclosed space. The particles that are dispersed can be any of those recited above, however, the particles are generally selected on the basis of the particular odors to be neutralized and the nature of the enclosed environment into which they are to be dispersed.

Following dispersal of the nanocrystalline particles, the particles are generally allowed to reside within the enclosed environment for a predetermined length of time so as to adsorb and neutralize the odor-causing chemicals and biologicals. At the expiry of that predetermined length of time, the particles (and the odor-causing agents) are removed from the enclosed space.

The nanocrystalline particles can be dispersed into the enclosed environment in a number of ways. The selection of the manner of dispersal is based largely upon the nature of enclosure. For example, if the enclosed space is a stationary environment (as in a room of a building or a home), the particles may be sprayed directly into the enclosed space, sprayed directly onto at least some of the exposed surfaces in the enclosed space, or incorporated into a fog which is dispersed within the enclosed space. If the particles are incorporated into a fog, upon dispersion into the enclosed environment, the particles are preferably dispersed in a substantially uniform manner within the enclosed space. It is preferred that the particles are present, at least initially, in the fog at a level of between about 0.1-100 g/m$^3$, more preferably between about 1-75 g/m, and most preferably between about 5-50 g/m$^3$. It is also within the scope of the present invention for the particles, simply to be dispersed as a powder or granules by sprinkling onto portions of the exposed surfaces within the enclosed space.

The particles may also be applied to the exposed surfaces within the enclosed space as a liquid dispersion. The liquid dispersion may be applied to, the surfaces as, a spray, by wiping, or through application as a steam. The dispersion is preferably aqueous in nature and comprises between about 10-500 g/L of the nanocrystalline particles, more preferably, between about 15-300 g/L, and most preferably between about 20-200 g/L. The dispersion may optionally comprise quantities of a surfactant so as to help stabilize the particle dispersion and maintain a balanced pH. TWEEN 80 is an exemplary surfactant for use within the present invention, however, any surfactants, particularly hydrophillic, nonionic surfactants may be used. The surfactant is preferably present in the dispersion between about 0.1-10 g/L and more preferably between about 0.5-7 g/L.

Preferred methods according to the present invention include the performance of additional cleaning steps which help to ensure maximum deodorization of the enclosed space. Prior to treatment of the exposed surfaces within the enclosed space with the nanocrystalline particles, at least a portion of those exposed surfaces are cleaned to remove loose dirt or debris thereon. Such cleaning can occur with common cleaning materials and/or water. Removal of the loose dirt or debris allows for better contact between the surfaces and the nanocrystalline particles once applied. It is possible that at least some of the exposed surfaces within the enclosed space will comprise a textile material, especially a textile material selected from the group consisting of carpets, upholstery, fabrics, paper products, leather, and combinations thereof. Depending upon the nature of the enclosed space, all other surfaces comprise non-textile materials such as plastic, metal, wood, drywall paint, foam, and combinations thereof. Removal of loose dirt and debris may be accomplished by sweeping, vacuuming, wiping, rinsing, spraying, or scrubbing of the exposed surface. Included in these operations are activities such as vacuuming and/or steam cleaning carpets, rugs, or other upholstery inside the enclosed space, washing windows, and dusting.

In certain applications, it is preferable for the textile materials to be wetted prior to being contacted with the nanocrystalline particles. Thus, after the initial cleaning step whereby loose dirt and debris are removed, the textile material surfaces are wetted with water and, optionally, a cleaning agent. Any traditional cleaning agent can be used so long as it is compatible with and will not damage the textile materials. The textile material surfaces are preferably left damp so that the nanocrystalline particles may be applied to a wetted surface. The wetted surface allows the nanocrystalline particles to better cling to the fibres of the textile material. Also, the wetting the textile materials causes an increase in activity among certain bacteria and microorganisms making them more susceptible to being killed by the nanocrystalline particles.

Following treatment of the textile materials with the nanocrystalline particles in one of the manners described above, the textile surfaces are preferably treated with water so as to remove at least some of the nanocrystalline particles, with the malodors absorbed thereon, from the textile materials. This water treatment step may be performed using any of the methods described above, however, it is preferably for the step to be performed suing a steam cleaner or a wet vacuum.

The other surfaces within the enclosed space (i.e., the non-textile surfaces) can be treated with the nanocrystalline particles contemporaneously with the textile surfaces. Such contemporaneous treatment may occur through a fogging or one of the other techniques described above. Also, the particle application method need not be the same for both the textile and non-textile surfaces. For example, die nanocrystalline particles may be applied to the textile surfaces by sprinkling a powder and to the non-textile surfaces by spraying with a liquid dispersion of nanoparticles.

The particles are allowed to contact the exposed surfaces within the enclosed space for a predetermined length of time. The exact length of time may be selected based on the intensity and nature of the malodors in the enclosed space prior to treatment. However, it is preferred that the nanocrystalline particles be allowed to contact the exposed surfaces for at least about one minute, more preferably for at least about 5 minutes, and most preferably for at least about 15 minutes.

After the surfaces have been treated with the nanocrystalline particles and the textile surfaces subsequently treated with water to remove at least a portion of the particles, the surfaces are allowed to dry. Typically, this drying step leaves a powder residue of particles on at least portions of the textile surfaces. Particles may also slightly adhere to non-textile surfaces as well, or may come to rest on substantially horizontal surfaces within the enclosed space.

The powder residue on the textile material surfaces can then be removed using a dry vacuum, compressed air, or similar means. Any particles adhering to or settled upon non-textile surfaces can be removed by cleaning at least a portion of the surfaces with a conventional cleaning agent (such as soap and water).

After the powder residue is removed from the textile surfaces, if needed, the textile surfaces may again be treated with water to remove further quantities of particles which remain in the textile materials. As mentioned above, such water treatment is preferably performed using a steam cleaner or wet vacuum. In situations where the odors are particularly intense, the process described above may need to be repeated a plurality of times until the odor is sufficiently removed.

In other embodiments of the present invention, the nanocrystalline particles may be used in a prophylactic sense, i.e., to prevent malodors from forming or building up inside the enclosed spaces. The nanocrystalline materials may be embedded within the materials making up the enclosed space. For example, the fibers of the upholstery or padding material used in the seats of mobile vehicles such as cars, trucks, boats, trains and airplanes could be manufactured with the nanocrystalline particles included therewith. Therefore, the textiles themselves are capable of adsorbing the malodors. Also, various building materials or materials from which fixtures are made could contain the nanocrystalline materials so that odors could be prevented from building up. For example, the nanocrystalline particles may be incorporated into the drywall or carpeting used within the enclosed space. The nanocrystalline particles may also be incorporated into filtration media through which air inside the enclosed space is circulated.

The present invention can be incorporated into foot deodorizing products for use inside shoes. Such products can include shoe inserts and sprays. The nanocrystalline metal oxide particles are non-toxic, therefore they are safe to use in close proximity to the human body.

The temperatures over which the present invention can be performed may vary from sub-freezing, through ambient, and up to several hundred degrees F. Preferably, the present invention is performed under ambient, atmospheric temperature and pressure conditions.

The nanocrystalline materials and formulations used with the present invention do not generally include a separately-added fragrance or perfume. Such fragrances are typically used to mask odors, in contrast, the present invention seeks to eliminate the odors entirely. The nanocrystalline materials preferably do not include sodium bicarbonate or other conventional odor sorbing materials. Further, it is preferable for the nanocrystalline materials and formulations comprising the nanocrystalline materials to be free from organic solvents. In certain embodiments, the entire nanocrystalline sorbent system is free from all organic materials, thereby rendering the entire system inorganic.

EXAMPLES

The following examples describe various experiments using nanocrystalline metal oxide materials to adsorb various chemical and biological agents which cause malodors. It is to be understood, however, that these examples are provided by way of illustration and nothing therein should be taken as a limitation upon the overall scope of the invention.

Example 1

In this example, the efficacy of various nanocrystalline metal oxides, available from a NanoScale Materials, Inc., under the name NanoActive® in eliminating the odor-causing material isovaleric acid was examined. Isovaleric acid is a chemical commonly associated with the malodor of sweaty human feet. Bacteria and fungus grow on the excess moisture in the form of sweat and produce the "stinky foot" odor. As the foot sweats, the perspiration moisture and warm temperature inside shoes (reaching up to 102° F.) create a fertile breeding ground for the bacteria that produce isovaleric acid. The more moisture present, the better the conditions for bacterial growth, and the greater the odor on feet and in shoes. Two of the most common sources of isovaleric acid are corynebacteria and micrococc bacteria. The successful treatment of foot and shoe odor depends on eradicating these organisms and destroying the isovaleric acid.

The test system utilized 10:1 by wt/wt ratio of sorbent to isovaleric acid and 10 minutes contact time. The experiments were performed in two different conditions: (i) Dry environment and (ii) Wet environment. Performing the experiments in a moist environment mimics the conditions of human feet and provides the required water to activate the odor neutralizing-agent contained in some commercial powders. Two test methods were applied to measure the removal/neutralization of isovaleric acid: (i) "Smell Test" to qualitatively determine the remaining isovaleric acid after treatment and (ii) Headspace GC/MS analysis to identify and quantify the removal and/or neutralization of isovaleric acid after treatment.

The experimental apparatus used in this example included a laboratory fume hood, balance, Eppendorf-type pipetters, a vortex mixer, a Hewlet Packard Series 15890A GC with an Alltech BC-WAX (part #19655) column with a 5972 HP mass spectrometer detector or a Flame Ionization Detector.

Forty mL vials with caps and septa were used for the qualitative analysis and 20-mL headspace GC vials with caps and septa were used for the quantitative analysis. The following sorbents were tested: NanoActive® ZnO (lot #05-0103), NanoActive® MgO (lot #02-0117), NanoActive® MgO Plus (lot #01-0105), NanoActive® ZnO slurry (7 wt % in water), Microgàrde™ Footwear Powder (Bernàrd Technologies Asia Pacific Pte Ltd), Gold Bond® Foot Powder (CHATTEM, Inc., lot#0073554-01), Equate® footpower (Wal-Mart Stores, Inc.), Odor-Eaters® (Combe Incorporated, Dist., lot #4464518), Total Body™ Foot Power (Total BodyProducts, lot #M3907), Dr. Scholl's® foot powder (Schering-Plough HealthCare Products, Inc., 50976-03). The isovaleric acid was obtained from Sigma-Aldrich (lot #01918PC).

For the smell test, 1.0 g of each sorbent was placed in the vial (an unrinsed vial was used for dry procedure and a rinsed vial with water was used for wet procedure). 100 µL of isovaleric acid was added and the vial was immediately capped and vortexed for 20 seconds. After vortexing, each sample was allowed to stand for 10 minutes before being ranked for olfactory intensity by seven panelists. A vial without sorbent, but with the same amount of isovaleric acid (100 µL) was used as a control.

Seven panelists evaluated the efficacy of the nanocrystalline metal oxides to eliminate isovaleric acid and compared to commercially available counterparts. Panelists ranked the measurements on a scale in terms of perceived intensity. Table 1 illustrates the panelists' perceived olfactory intensity of the samples in both dry and wet environments. Panelists did not perceive any smell from the samples treated with the nanocrystalline metal oxides in both dry and wet conditions. Isovaleric acid treated with NanoActive® ZnO slurry produced a weak sweet and fruity smell. Panelists reported a weak to strong stinky feet odor from the commercially available counterparts in dry condition. The commercially available foot powders reduced the odor of isovaleric acid but produced other types of unpleasant scents in wet condition.

TABLE 1

| | Perceived Olfactory Intensity | |
|---|---|---|
| Sorbent | Dry environment | Wet environment |
| Blank | Control | Control |
| NanoActive ® ZnO | No smell | No smell |
| NanoActive ® MgO Plus | No smell | No smell |
| NanoActive ® MgO | No smell | No smell |
| NanoActive ® ZnO slurry | No test for dry condition | Weak sweet and fruity odor |
| Odor-Eaters ® | Strong detergent odor | Weak unpleasant detergent odor |
| MicroGarde ® | Strong feet odor | Medium fruity feet odor |
| Total Body ™ Foot Powder | Weak mint clean odor | Medium mint feet odor |
| Dr Scholl's ® | Strong mint feet odor | Weak mint odor |
| Equate ® Foot Powder | Medium mint feet odor | Medium mint feet odor |
| GoldBond ® | Medium mint feet odor | Strong mint odor |

In the headspace GC/MS analysis, each sorbent was tested in triplicate to provide the maximum statistical reliability. One grain (1.0 g) of each sorbent was placed into 20-mL headspace GC vials (unrinsed vial was used for dry procedure and rinsed vial with water was used for wet procedure). 100 µL of isovaleric acid was added and the vial was immediately capped and vortexed for 20 seconds. After vortexing, each sample was allowed to stand for 10 minutes as contact time and/or equilibrium time at an ambient condition. The vial without the sorbent but with the same amount of isovaleric acid (100 µL) was used as a control. A 1-mL headspace sample was taken with a 5-mL gas tight syringe. Each sample was then immediately injected directly into GC.

The peak size (peak area) of the control was compared with the peak size of the sorbent treated sample and was reported as percent agent removed. For each the triplicate run, the mean and standard deviation of sample were calculated by the equation used in the Microsoft Excel® functions AVERAGE and STDEV.

The nanocrystalline metal oxides removed over 99% of isovaleric acid whereas the commercial counterparts achieved about 0 to 34.9% removal of odor under dry conditions. Under wet conditions, the nanocrystalline metal oxides maintained their efficacy to eliminate isovaleric acid, ranging from 98.1 to 99.6% removal, and were still superior than their commercial counterparts. The commercially available foot powders removed isovaleric acid at a level of about 58.5 to 96.2% under the same conditions. The average values of each triplicate run for each sorbent are reported in Table 2.

TABLE 2

| Sorbent | % Removal of Isovaleric acid | |
| --- | --- | --- |
| | Dry environment | Wet environment |
| Blank | Control | Control |
| NanoActive ® ZnO | 98.8% | 98.1% |
| NanoActive ® MgO Plus | 99.9%+ | 99.6% |
| NanoActive ® MgO | 99.9%+ | 99.4% |
| NanoActive ® ZnO slurry | No test for dry condition | 98.7% |
| Odor-Eaters ® | 34.9% | 93.3% |
| MicroGarde ® | 20.1% | 95.0% |
| Total Body ™ Foot Powder | 14.6% | 68.7% |
| Dr Scholl's ® | 3.2% | 74.5% |
| Equate ® Foot Powder | 0% | 58.5% |
| GoldBond ® | 0% | 96.2% |

Figure 3:
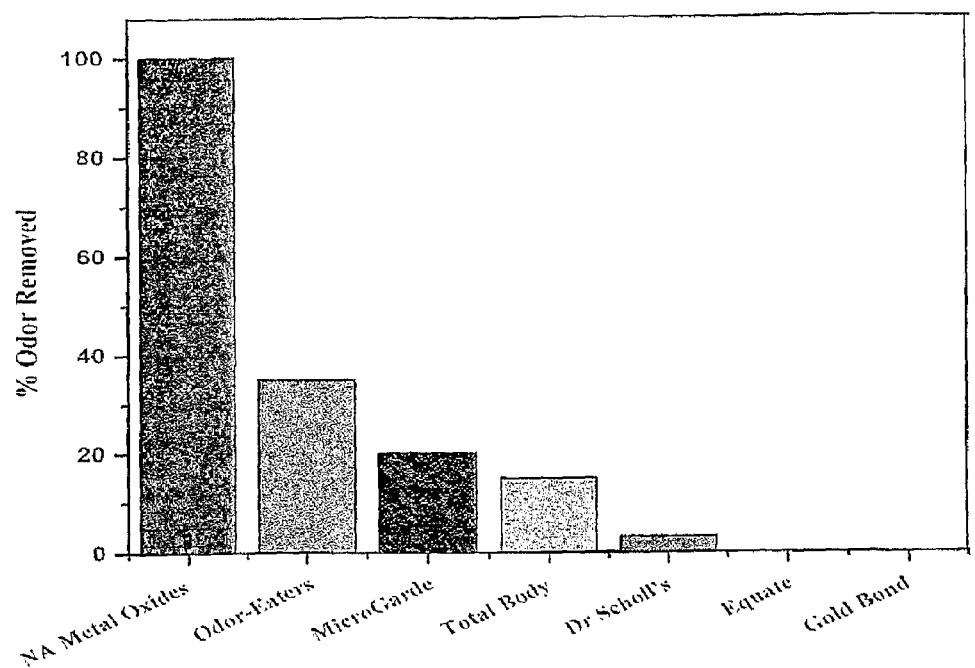
FIG. 3 is a graph of the percent of isovaleric acid removed under dry conditions by several sorbent materials.
Figure 4:
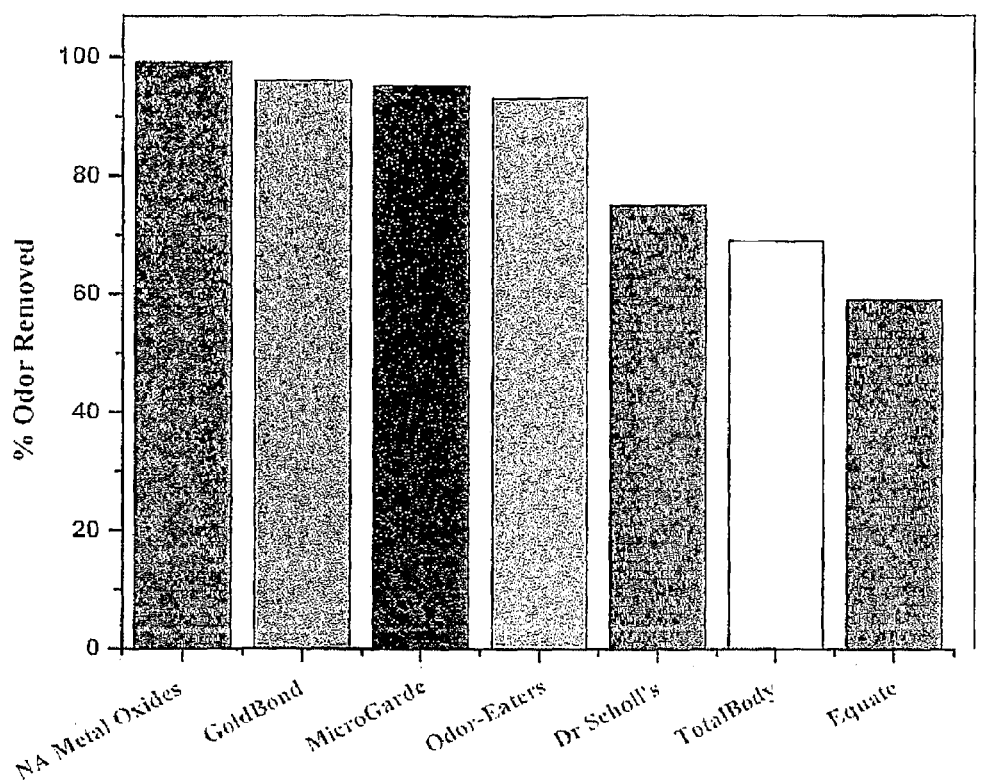
FIG. 4 is a graph of the percent of isovaleric acid removed under wet conditions by several sorbent materials.

The percent removal of isovaleric acid for each sorbents is illustrated in FIGS. 3 and 4. The nanocrystalline metal oxides outperformed their commercially available counterparts when challenged against isovaleric acid under dry conditions, as seen in FIG. 3. Results of the wet environment trials (FIG. 4) indicate that the nanocrystalline metal oxides maintained their superior odor elimination abilities.

Figure 5:
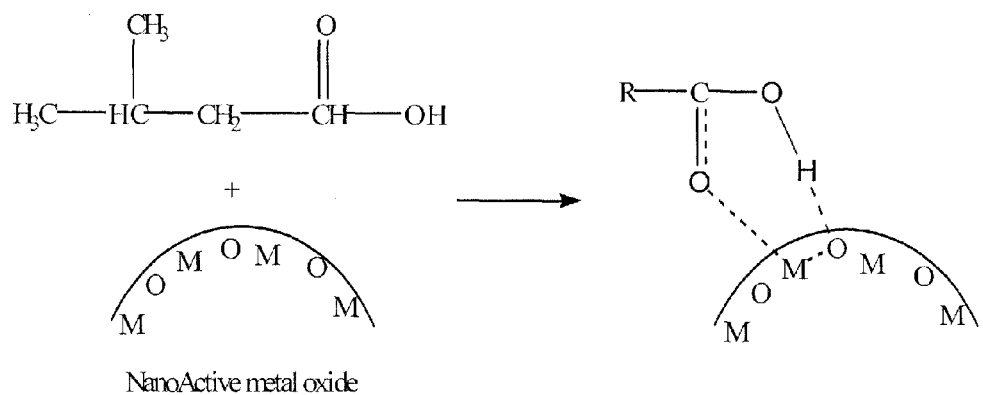
FIG. 5 depicts a chemical decomposition process for isovaleric acid exposed to a nanocrystalline metal oxide.

The chemical decomposition process of isovaleric acid exposed to nanocrystalline metal oxide sorbents is illustrated in FIG. 5. The results of perceived olfactory intensity by panelists concurred with the headspace GC/MS analysis in that nanocrystalline metal oxides were the only formulations that completely eliminated the odor in both wet and dry environments. Panelists perceived no smell from the samples treated with nanocrystalline metal oxides. The results of headspace GC analysis indicated that the peak of isovaleric acid was under the detection limit from the samples treated with the nanocrystalline metal oxides.

The high chemical reactivity and high adsorption capability of NanoActive metal oxides make them distinctively different from their commercial counterparts. The nanocrystalline metal oxides did not simply mask the odor, but also decomposed the isovaleric acid by chemical reaction.

Example 2

In this example the odor elimination ability of the nanocrystalline metal oxide formulations in dry and aqueous systems for several malodor target compounds was examined. The target compounds selected represent several different odor families, including acidic, pH neutral, and basic compounds. Other odor elimination formulations included in the investigation were commercially available MicroGarde® and sodium bicarbonate. MicroGarde® is a chlorine dioxide-releasing agent specifically designed to eliminate odors. Sodium bicarbonate, a common odor elimination material, has previously been used in many odor elimination products as an active ingredients.

Various equipment used in this example included a laboratory fume hood, a balance, Eppendorf-type pipetters, a vortex mixer, a Hewlet Packard Series II 5890A GC with an Alltech EC-WAX (part #19655) column with a 5972 HP mass spectrometer detector or a Flame Ionization Detector, and a Thermo Electron Nicolet 6700 FTIR equipped with a liquid nitrogen cooled detector.

The target materials tested included isovaleric acid (CAS #503-74-2, Sigma Aldrich lot #09198PC), ethyl mercaptan (CAS #75-08-1, Acres lot #A020001801), cadaverine (1,5-Diaminopentane, 95%, CAS #462-94-2, Sigma Aldrich lot #13322JD), ammonium hydroxide (28-30% from Sigma Aldrich, CAS #1336-21-6, lot #14015HC), and acetaldehyde (CAS #75-07-0, Sigma Aldrich batch #00163-AD).

The target materials were tested with the following sorbent formulations: 7% aqueous formulation of NanoActive® metal oxides, dry powdered sodium bicarbonate (CAS #14455-8, Sigma Aldrich lot #094K0066), 7% aqueous formulation of sodium bicarbonate, deionized water, and MicroGarde®.

Two test systems were used to assess the odor elimination capabilities of the selected sorbent formulations. The first test system included a headspace-gas chromatograph system equipped with a flame ionization detector. The second test system included a 10 cm gas cell apparatus placed in Thermo Scientific Nicolet 6700 FT-IR Spectrometer equipped with a liquid nitrogen-cooled MCT detector.

In preparation for headspace analysis by GC-FID, headspace vials (20 mL) were labeled and loaded with 1 g of the sorbent formulation (test vials) or were left empty (blank vials). All vials were then loaded with a specified amount of malodor challenge agent. After loading, the vials were immediately capped and vortexed for 10 seconds to mix the agent and test substance. The loaded headspace vials were then allowed to stand for 10 minutes to equilibrate before being analyzed by headspace GC/FID. In the case of acetaldehyde, the stock acetaldehyde vial was maintained in a Julabo cooling bath at −15° C. The headspace vials were chilled in liquid nitrogen for 30 seconds and then loaded with 50 μL of acetaldehyde using a chilled microliter syringe. These steps were necessary to minimize loss of acetaldehyde due to evaporation while handling. The ethyl mercaptan and cadaverine did not require similar cooling techniques during handling. Each headspace vial (test and blanks) received 50 μL of ethyl mercaptan or cadaverine and was immediately capped, vortexed, and allowed to equilibrate before analysis. All samples and blanks were done in triplicate. The gas chromatography method parameters for acetaldehyde, ethyl mercaptan and cadaverine are provided in Table 3 and 4.

TABLE 3

| | |
| --- | --- |
| Detector | FID |
| Column | EC-WAX, 30 m × 0.32 mm × 0.25 μm |
| Initial Temperature | 70° C. for 0.75 min |
| Ramp 1 Temperature | 65° C./min to 125° C., hold 1.85 min |
| Ramp 2 Temperature | 65° C./min to 180° C. |
| Final Temperature | 180° C., hold for 0.76 min |
| Carrier gas | Nitrogen, 1 mL/min |

TABLE 3-continued

| | | | |
|---|---|---|---|
| Split Ratio | 58:1 | | |
| Injector | Tekmar 7000 Headspace Autosampler | | |
| | Loop size | 1 | mL |
| | Platen Temperature | 30° | C. |
| | Platen Time | 5 | min |
| | Sample Equilibration Time | 5 | min |
| | Vial Size | 22 | mL (20 mL) |
| | Pressurize Setting | 15 | PSI at 40 ml/min |
| | Pressure Time | 0.20 | min |
| | Pressure Equilibrium Time | 0.20 | min |
| | Loop Fill Time | 0.20 | min |
| | Loop Equilibrium Time | 0.15 | min |
| | Inject | 0.30 | min |
| | Sample Loop Temperature | 40° | C. |
| | Line Temperature | 45° | C. |
| | Injections per vial | 1 | |
| | GC cycle Time | 10 | min |

TABLE 4

| | |
|---|---|
| Detector | FID |
| Column | EC-WAX, 30 m × 0.32 mm × 0.25 μm |
| Initial temperature | 70° C. for 5 min |
| Ramp 1 temperature | 30° C./min to 175° C., hold for 1 min |
| Ramp 2 temperature | NA |
| Final temperature | 175° C., hold for 1 min |
| Carrier gas | nitrogen, 1 ml/min |
| Split ratio | 58:1 |
| Injector | manual injection, 1 ml using a gas tight syringe |

In preparation for gas phase analysis by FT-IR, a 10 cm gas cell apparatus was purged with nitrogen gas for 5-10 minutes. Following the purge period a background spectrum was recorded by averaging 256 scans collected at a resolution of 8.0. Next, 100 μl of ammonium hydroxide (28-30% ammonia in water) was placed in the round bottom flask via the rubber septum port on the gas cell apparatus and allowed to equilibrate for 10 minutes. After equilibration, a baseline spectrum of the ammonia was recorded by averaging 256 scans collected at a resolution of 8.0. The bands located at 963 and 927 cm$^{-1}$ were integrated and the peak areas were recorded as baseline values. After collecting the baseline spectrum of ammonia, samples were analyzed by placing 1 g of the sorbent formulation in a clean gas cell test apparatus via the rubber septum port. Next, 100 μl of the ammonium hydroxide was added to the flask and the mixture was vortexed for 20 seconds. The mixture was allowed to equilibrate for 10 minutes, after which an infrared spectrum was recorded. The bands at 963 and 927 cm$^{-1}$ were integrated and the peak area recorded. All samples and blanks were tested in triplicate.

For GC-FID and GC-MS analysis the following formula was used to calculate percent removal:

$$\left(1 - \frac{S}{B}\right)100 = \% \text{ Removal of Malodorant}$$

Where:
S=Average peak area of the Sample
B=Average peak area of the Blank

For FT-IR analysis the following formula was used to calculate percent removal:

$$\left(1 - \left(\frac{(I_i/K_i) + (I_{ii}/K_{ii})}{2}\right)\right)100 = \% \text{ Removal of Malodorant}$$

Figure 6:
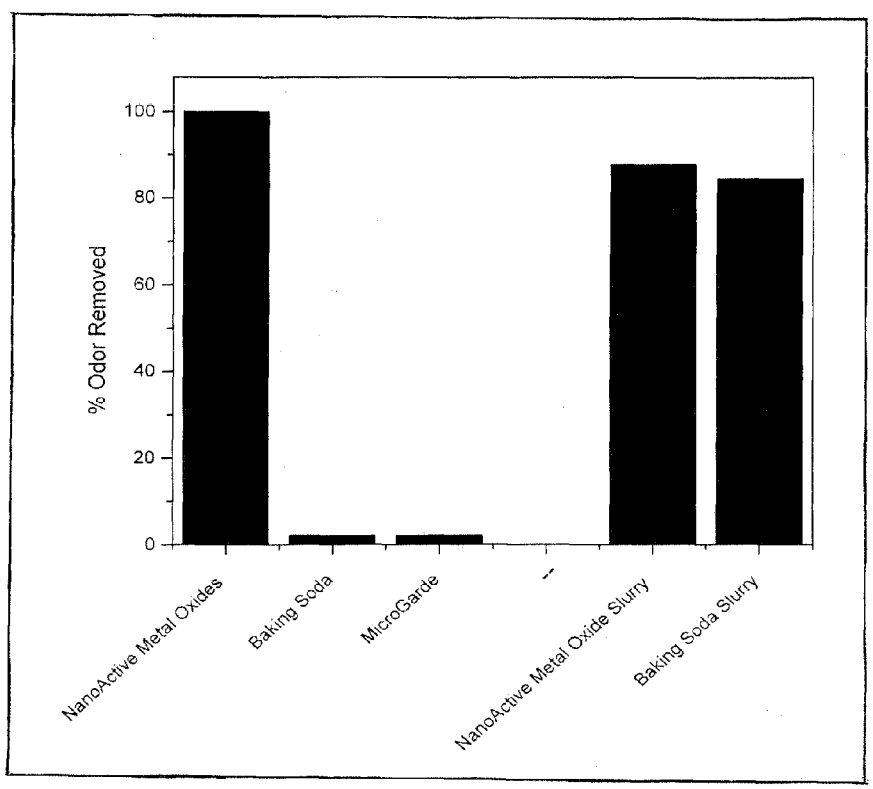
FIG. 6 is a graph of the percent acetaldehyde removed by various sorbent materials.
Figure 7:
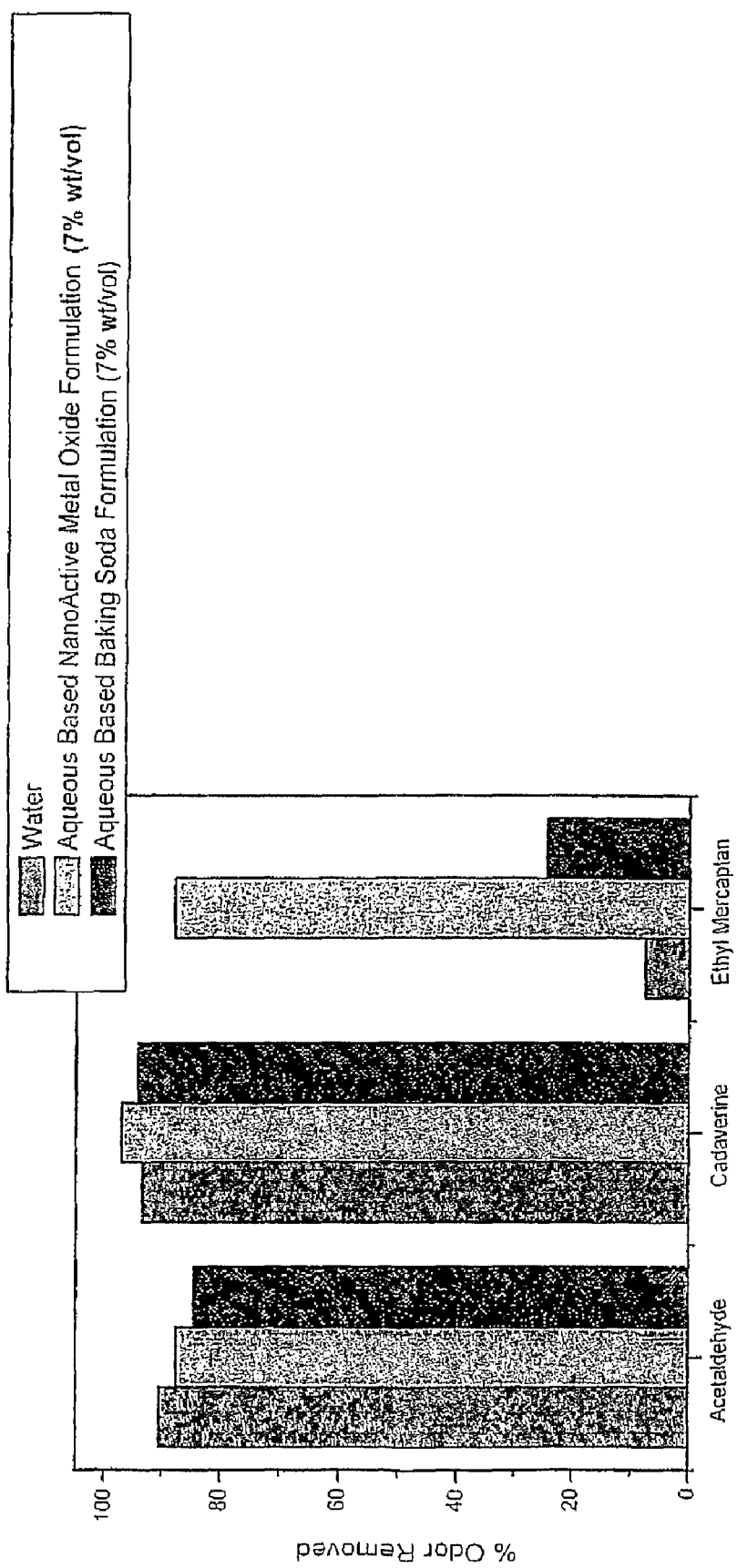
FIG. 7 is a graph comparing odor removal for three malodor compounds using water, aqueous-based formulations of nanocrystalline metal oxides, and aqueous formulations of sodium bicarbonate.
Figure 8:
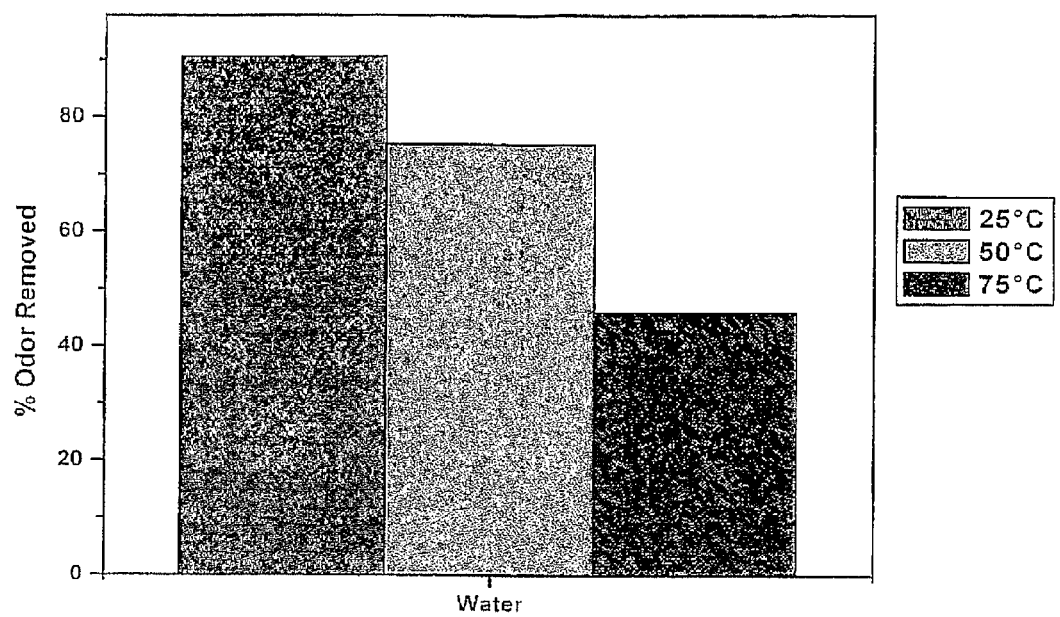
FIG. 8 is a graph comparing odor removal by water alone at varying temperatures.

Where:
Ii=Average peak intensity of sample at 963 cm$^{-1}$
Ki=Average peak intensity of blank at 963 cm$^{-1}$
Iii=Average peak intensity of sample at 927 cm$^{-1}$
Kii=Average peak intensity of blank at 927 cm$^{-1}$ When challenged against acetaldehyde, as illustrated in FIG. 6, the nanocrystalline metal oxide formulations were superior to the commercially available counterparts (sodium bicarbonate and MicroGarde®). The nanocrystalline metal oxide formulations removed greater than 99.9% of the agent from the headspace, whereas sodium bicarbonate and Micro-Garde® were completely ineffective, removing less than 1% of acetaldehyde. The aqueous based metal oxide formulation showed a small reduction in performance compared to the dry powder formulation removing 87.6% of the acetaldehyde from the headspace of the test system. Sodium bicarbonate, on the otherhand, showed a significant improvement when challenged as an aqueous based formulation. The aqueous based sodium bicarbonate formulation removed 84.5% of acetaldehyde whereas the dry powder sodium bicarbonate removed less than 1% of acetaldehyde. As shown in FIG. 7, the performance of the aqueous based formulations of sodium bicarbonate is equal to that of water alone. Therefore, the significant improvement in performance when in aqueous form, can be attributed to acetaldehyde's affinity for water and not sodium bicarbonate. Although the headspace concentration is reduced when water alone is used. FIG. 8 shows that acetaldehyde is released back into the headspace upon heating. At a temperature of 25° C. water removes 90.5% of the acetaldehyde, but when heated to 75° C., only 45.9% is removed.

Figure 9:
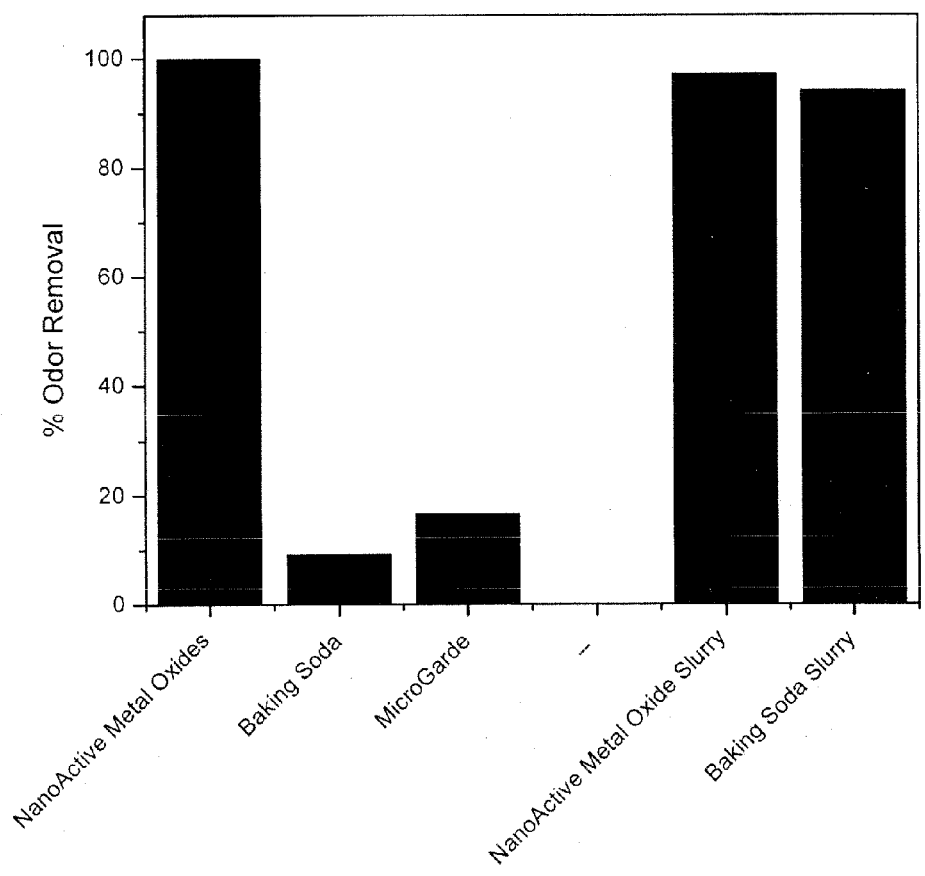
FIG. 9 is a graph comparing the percent of cadaverine removed by several sorbent materials.

As illustrated in FIG. 9, when dry powder nanocrystalline metal oxides were challenged against cadaverine, they were more effective in reducing the concentration of cadaverine in the headspace than the dry powder commercial counterparts. Similar to die acetaldehyde challenge, sodium bicarbonate as a dry powder was ineffective at removing cadaverine from the headspace of the test system and was effective only when used in slurry form. Cadaverine, like acetaldehyde, was removed from the headspace in equal amounts when treated by water or aqueous based formulations. This trend can be attributed to cadaverine's affinity for water. Like acetaldehyde, the headspace concentration of cadaverine is reduced by water alone, but would be easily released back into the headspace heated or if a pressure drop occurred.

Figure 10:
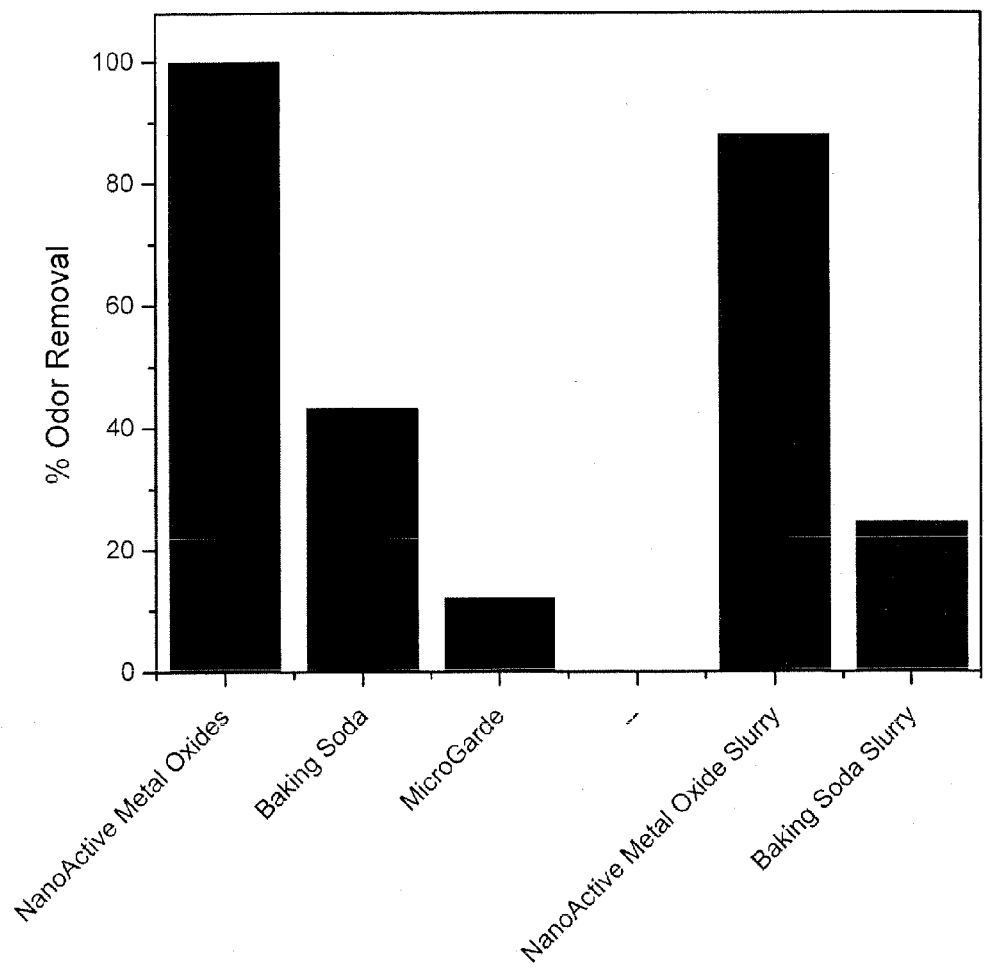
FIG. 10 is a graph comparing the percent of ethyl mercaptan removed by several sorbent materials.

As illustrated in FIG. 10, when challenged against ethyl mercaptan, the nanocrystalline metal oxide formulations were superior to their commercially available counterparts (sodium bicarbonate and MicroGarde®). The nanocrystalline metal oxide formulations removed 99.9+% of ethyl mercaptan from the headspace of the test system, whereas sodium bicarbonate and MicroGarde® removed 43.3% and 12.0%, respectively. When challenged against ethyl mercaptan, aqueous based nanocrystalline metal oxide formulations exhibited an advantage over sodium bicarbonate. Ethyl mercaptan, unlike acetaldehyde and cadaverine, is only slightly soluble in water (0.1-1%). The low solubility results in little contribution from water for the removal of ethyl mercaptan from the headspace of the test system, as shown in FIG. 7. Thus, removal of 87.6% ethyl mercaptan can be attributed to the nanocrystalline metal oxides present in the slurry formulation and not the water.

Figure 11:
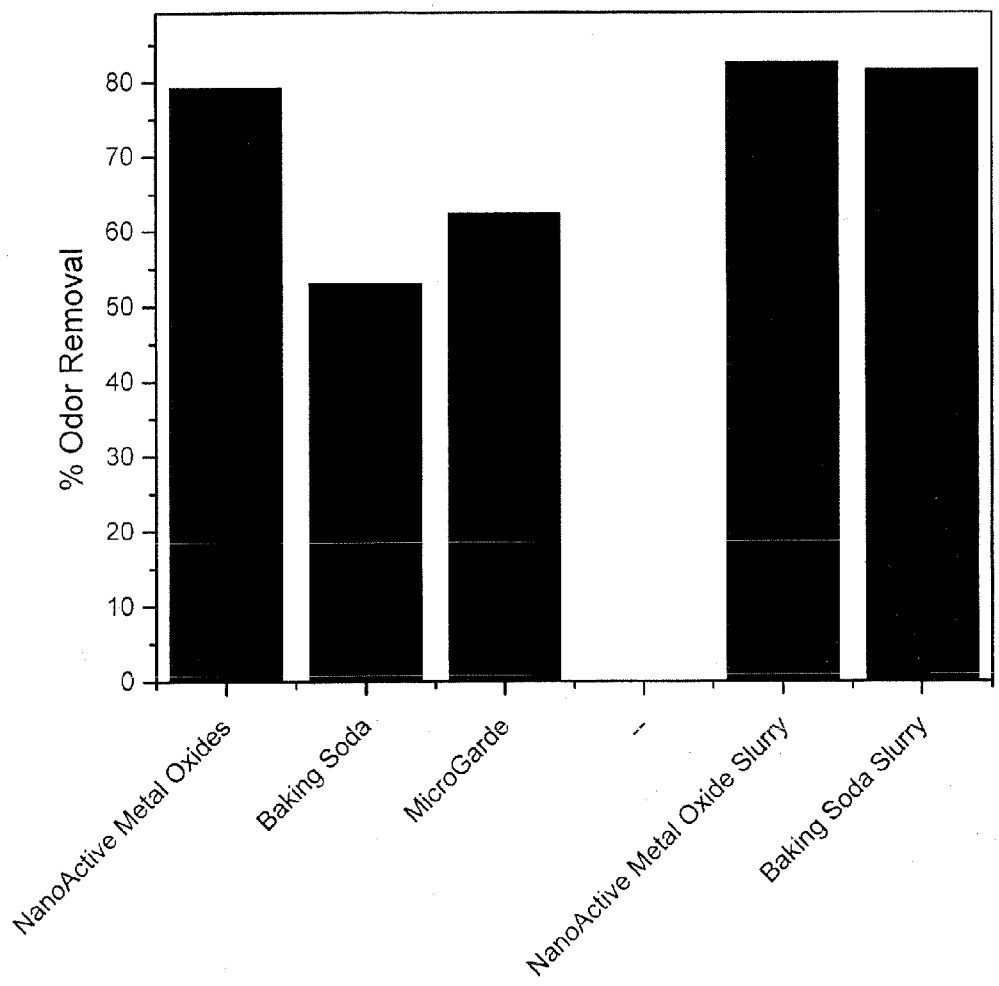
FIG. 11 is a graph comparing the percent of ammonia removed by several sorbent materials.
Figure 12:
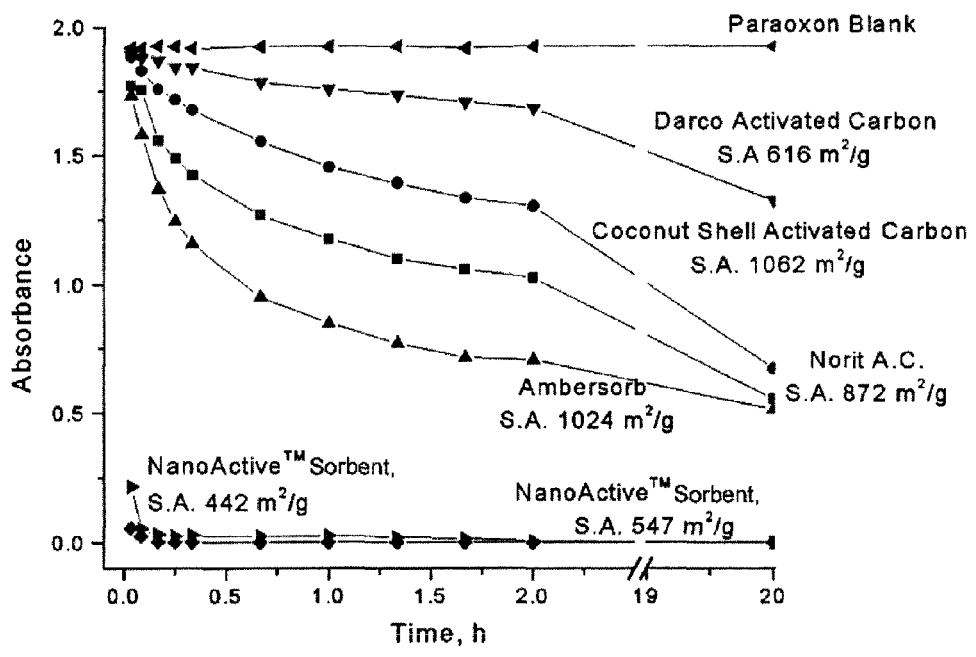
FIG. 12 is a graph comparing the removal of paraoxon by several sorbent materials.
Figure 13:
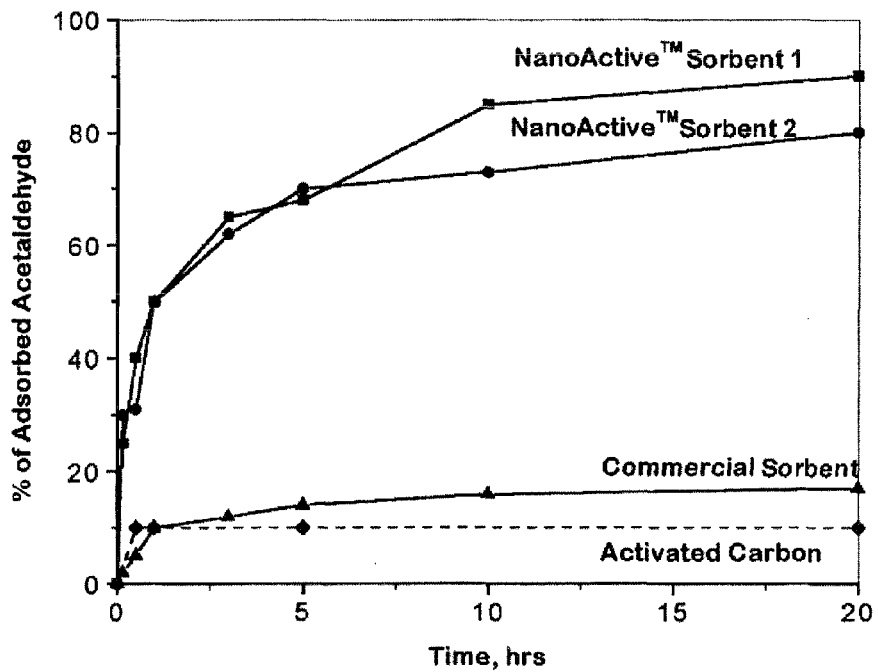
FIG. 13 is a graph comparing the adsorption of acetaldehyde by several sorbent materials.

When challenged against ammonia, dry powder nanocrystalline metal oxide formulations were less effective (79.2% removed) than the aqueous based nanocrystalline metal oxide formulations (84.4% removed), as illustrated in FIG. 11. Sodium bicarbonate in a slurry form was the overall best performer removing 86.1% of ammonia from the headspace of the test system. Overall, aqueous-based formulations displayed more effectiveness and were slightly better than dry powder nanocrystalline metal oxide formulations. The least effective formulation was dry powder sodium bicarbonate (53.0% removed) followed by dry powder MicroGarde® (62.4% removed).

Example 3

In this Example, the nanocrystalline metal oxides tested in Examples 1 and 2 above were used to treat the interior of a 2004 Honda Civic that was previously driven by a smoker. The car had been cleaned and detailed prior to treatment, but a noticeable tobacco smoke odor was present. A powder formulation of nanocrystalline metal oxides (533 grams) was dispersed on all the surfaces of the car's interior, including the upholstery, carpet, and dash. An aqueous suspension of nanocrystalline metal oxide particles (approximately 1 liter) was sprayed on the vehicle's head liner, vertical surfaces (except car seat upholstery), hard surfaces, the trunk interior, and in hard to reach areas such as under the seats. The car did not contain any floor mats. The powder was rubbed into the upholstery and the car was closed up and left over night (15 hours) to deodorize. The temperature for the duration of the experiment ranged from 55° F. at the time of application to a low of 30° F. overnight.

After the overnight treatment, the car was evaluated by four individuals for improvement in tobacco odor levels. All of the individuals noticed a significant improvement in the car's odor.

Example 4

In this Example, the antibacterial properties of NanoActive® ZnO were tested against *E. coli* (ATCC #10536) and *Staphylococcus aureus* (ATCC #6538). Each set of sterile test tubes used in this Example was filled with appropriate nutrient broth medium and the desired amount of NanoActive® ZnO was added. Once prepared, the organism stock culture was added to each test tube. The test tubes were capped and gently agitated. The tubes were then placed in an incubator at 37° C. for an initial incubation period (24 hours). After incubation, the tubes were visually inspected for turbidity (cloudiness) and aliquots were extracted and placed into fresh nutrient media. After an additional incubation period of approximately 24 hours (total incubation time of 48 hours), the tubes were inspected to confirm the absence or presence of bacterial growth.

As shown in Table 5, the 48-hour subculture tubes for NanoActive® ZnO exhibited no growth even at low concentrations of sorbent (ranging from 1.00% to 0.25%) demonstrating that NanoActive® ZnO is effective at killing *E. coli*. Against the heartier and more difficult to kill *Staphylococcus*, NanoActive® ZnO was effective at a concentration of 4%.

TABLE 5

| Organism | Gram | Sorbent concentration in solution | 48 hour subculture tubes | | | Positive control | Negative control | Sterility control |
|---|---|---|---|---|---|---|---|---|
| | | | 1 | 2 | 3 | | | |
| *E. coli* (ATCC # 10536) | (−) | 0.25% | (−) | (−) | (−) | (+) | (−) | (−) |
| | | 0.50% | (−) | (−) | (−) | (+) | (−) | (−) |
| | | 1.00% | (−) | (−) | (−) | (+) | (−) | (−) |
| *Staphylococcus aureus* (ATCC # 6538) | (+) | 4.0% | (−) | (−) | (−) | (+) | (−) | (−) |

While not wishing to be bound by any particular theory, it is believed that zinc ions disrupt bacterial enzyme systems by displacing magnesium ions and inhibiting glycolytic enzymes. In addition, the high affinity and attraction that metals have for sulfur found in the bacterial cell wall peptidoglycans leads to the disruption of disulfide bonds. The reduction of these sulfur bonds causes the proteins to denature preventing the cell from transporting oxygen, thus disabling the ability of the bacteria to metabolize oxygen.

Example 5

Mildew and certain fingi have odors which can become problematic in many enclosed environments, such as in the home. In this Example, the anti-fungal activity of NanoActive® ZnO was tested against *Trichophyton* and *Penicillium funiculosum*. The nanocrystalline ZnO was added in the desired amount to test tubes filled with liquid broth medium. The medium was gently agitated to disperse the ZnO throughout the entire media tube and then inoculated with the fungal stock suspension. The culture suspensions were allowed to grow for 24 hours and then transferred into fresh media for an additional 24 hours of incubation. The tubes were visually inspected for growth.

The results are shown in Table 6. The 48-hour subculture tubes for the nanocrystalline ZnO exhibited no growth at a sorbent concentration of 4.0%

TABLE 6

| Organism | Sorbent concentration in solution | 48 hour subculture tubes | | | Positive control | Negative control | Sterility control |
|---|---|---|---|---|---|---|---|
| | | 1 | 2 | 3 | | | |
| Trichophyton | 4.0% | (−) | (−) | (−) | (+) | (−) | (−) |
| Penicillium funiculosum | 4.0% | (−) | (−) | (−) | (+) | (−) | (−) |

Example 6

In this Example, additional anti-fungal testing was conducted against *Stachybotrys* and *Alternaria mycelia* using NanoActive® ZnO. Petri plates of the appropriate growth media were prepared and inoculated with fungus. The organisms were allowed to grow. Once lawn growth was achieved, the fungi were treated with the nanocrystalline ZnO. After the 75-minute contact time had elapsed, plugs (samples) were taken from the treated lawn plates and constituted on fresh media plates. The plates were again allowed to grown until sufficient growth was observed on the positive controls.

The nanocrystalline ZnO achieved nearly a 90% reduction in the growth of *Alternaria*. In the studies utilizing *Stachybotrys mycelia*, the nanocrystalline ZnO was able to completely inhibit the growth of the fungi in approximately 18% of the samples and significantly slow the growth in the remaining 72% samples in 1-week trials.

Example 7

In this Example, the anti-fungal capabilities of NanoActive® ZnO in pellet form was tested against *Penicillium funiculosum* (ATCC #11797). The nanocrystalline ZnO was placed on nutrient agar plates that were inoculated with *Penicillium funiculosum*. The patterns of the fungus growth were monitored and compared to that of the controls (no pellet/inert pellet). The nanocrystalline ZnO was able to effectively inhibit the growth of the organism as observed by a zone of inhibition established around the pellet and growth was never established on the pellet (30 day experiment).

We claim:

1. A method of deodorizing an enclosed space by removing a malodorous substance present in said space comprising:
   (a) contacting said malodorous substance with a quantity of nanocrystalline particles consisting of a member selected from the group consisting of metal oxides and metal hydroxides for sorbing said substance, said particles presenting an average crystallite size of less than about 25 nm and an average surface area of at least 15 m$^2$/g.

2. The method according to claim 1, said nanocrystalline particles being incorporated into filtration media, and said contacting step comprising passing air from said enclosed space through said filtration media for removal of at least a portion of said malodorous substance from said air.

3. The method according to claim 1, said malodorous substance being selected from the group consisting of urine, feces, sweat, decaying biological material, pesticides, organic solvents, volatile organic compounds, and combinations thereof.

4. The method according to claim 3, said pesticide being selected from the group consisting of acephate, azinphos-methyl, bensulide, cadusafos, chlorethoxyfos, chlorpyrifos, chlorpyrifos methyl, chiorthiophos, coumaphos, dialiflor, diazinon, dichlorvos (DDVP), dicrotophos, dimethoate, dioxathion, disulfoton, ethion, ethoprop, ethyl parathion, fenamiphos, fenitrothion, fenthion, fonofos, isazophos methyl, isofenphos, malathion, methamidophos, methidathion, methyl parathion, mevinphos, monocrotophos, naled, oxydemeton methyl, parathion, phorate, phosalone, phosmet, phosphamidon, phostebupirim, pirimiphos methyl, profenofos, propetamphos, sulfotepp, sulprofos, temephos, terbufos, tetrachlorvinphos, tribufos (DEF), trichlorfon, and combinations thereof.

5. The method according to claim 3, said malodorous substance being selected from the group consisting of acrolein, acetone, ethanolamine, diesel fuel, formaldehyde, hydrofluoric acid, methanol, methylene chloride, nitric acid, nitrobenzene, phosphoric acid, polyvinyl alcohol, sulfuric acid, thiourea, toluene, thriethanolamine, methyl acrylate, acetic acid, methylpyrazines, acrylonitrile, nonvolatile nitrosamines, crotonaldehyde, N-nitrosamines, carboxylic acids, phenols, DDT/delirin, pyrrolidine, dimethylntrosamine, stearic acid, ethylamine, trimethylamine, vinyl chloride, furfural, and combinations thereof.

6. The method according to claim 1, wherein said enclosed space presents a plurality of exposed surfaces which at least in part define said enclosed space, step (a) comprising dispersing said nanocrystalline particles into said enclosed space, said particles contacting said exposed surfaces for sorbing odors and odor-causing materials within said enclosed space.

7. The method according to claim 6, wherein said method further comprises after said contacting step, (b) removing at least some of said particles from said enclosed space after a predetermined length of time.

8. The method according to claim 7, said method further comprising prior to step (a), (c) cleaning at least a portion of said exposed surfaces in said enclosed space to remove loose dirt or debris thereon.

9. The method according to claim 8, at least some of said exposed surfaces comprising a textile material.

10. The method according to claim 9, said textile material being selected from the group consisting of carpets, upholstery, fabrics, leather, paper products, and combinations thereof.

11. The method according to claim 9, said method further comprising subsequent to step (c) and prior to step (a), treating at least a portion of said textile material surfaces with water and, optionally, a cleaning agent.

12. The method according to claim 11, said textile surfaces being damp while performing step (a).

13. The method according to claim 11, step (b) comprising treating said textile surfaces with water so as to remove at least a portion of said particles from said textile material.

14. The method according to claim 13, the step of treating said textile surfaces with water being performed using a steam cleaner or wet vacuum.

15. The method according to claim 13, after the step of treating said textile surfaces with water, drying all surfaces within said enclosed space, thereby leaving a powder residue of said particles on at least a portion of said textile surfaces.

16. The method according to claim 15, step (b) further comprising removing at least a portion of said powder residue using a dry vacuum or compressed air.

17. The method according to claim 16, step (b) further comprising cleaning at least a portion of said exposed surfaces which do not comprise a textile material with a cleaning agent.

18. The method according to claim 17, step (b) further comprising, after removing said powder residue from said textile surfaces, treating at least a portion of said textile surfaces with water to remove further quantities of particles remaining in said textile materials.

19. The method according to claim 17, said dispersion comprising between about 10-500 g/L of said particles and from about 0.1-10 g/L of a surfactant dispersed in an aqueous medium.

20. The method according to claim 11, said particles being dispersed into said enclosed space as a powder.

21. The method according to claim 20, said particles being dispersed by spraying said particles directly onto said exposed surfaces or by creating a fog of said particles within said enclosed space.

22. The method according to claim 21, said particles being substantially uniformly dispersed within said enclosed space.

23. The method according to claim 22, said particles being dispersed by creating a fog of said particles that is substantially uniformly dispersed within said enclosed space, said particles being present in said fog at a level of between about 0.1-100 $g/m^3$.

24. The method according to claim 6, step (a) comprising applying a liquid dispersion including said particles to at least some of said exposed surfaces within said enclosed space.

25. The method according to claim 1, said enclosed space being selected from the group consisting of enclosed stationary environments and enclosed mobile environments.

26. The method according to claim 1, said particles being selected from the group consisting of metal oxides and hydroxides of Mg, Sr, Ba, Ca, Ti, Zr, Fe, V, Mn, Ni, Cu, Al, Si, Zn, Ag, Mo, Sb, and mixtures thereof.

* * * * *